US010509905B2

(12) United States Patent
Gupta et al.

(10) Patent No.: US 10,509,905 B2
(45) Date of Patent: Dec. 17, 2019

(54) RANSOMWARE MITIGATION SYSTEM

(71) Applicant: Attivo Networks Inc., Fremont, CA (US)

(72) Inventors: Anil Gupta, Bangalore (IN); Harinath Vishwanath Ramchetty, Bangalore (IN); Venu Vissamsetty, San Jose, CA (US)

(73) Assignee: ATTIVO NETWORKS INC., Fremont, CA (US)

( * ) Notice: Subject to any disclaimer, the term of this patent is extended or adjusted under 35 U.S.C. 154(b) by 71 days.

(21) Appl. No.: 15/695,952

(22) Filed: Sep. 5, 2017

(65) Prior Publication Data

US 2019/0073475 A1 Mar. 7, 2019

(51) Int. Cl.
*G06F 21/56* (2013.01)
*G06F 21/55* (2013.01)
*G06F 16/14* (2019.01)
*G06F 16/16* (2019.01)
*G06F 16/17* (2019.01)

(52) U.S. Cl.
CPC .......... *G06F 21/565* (2013.01); *G06F 16/148* (2019.01); *G06F 16/162* (2019.01); *G06F 16/1734* (2019.01); *G06F 21/554* (2013.01); *G06F 21/56* (2013.01)

(58) Field of Classification Search
CPC ...... G06F 21/565; G06F 21/554; G06F 21/56; G06F 16/162; G06F 16/148; G06F 16/1734; H04L 63/145; H04L 63/1491
USPC ............................................ 726/23; 709/220
See application file for complete search history.

(56) References Cited

U.S. PATENT DOCUMENTS

| | | | | |
|---|---|---|---|---|
| 7,543,269 | B2 * | 6/2009 | Krueger | G06F 8/61 717/102 |
| 7,890,612 | B2 * | 2/2011 | Todd | G06F 21/577 709/220 |
| 8,849,880 | B2 * | 9/2014 | Thelen | G06F 16/13 707/831 |
| 9,807,115 | B2 * | 10/2017 | Kolton | H04L 63/145 |
| 9,942,270 | B2 * | 4/2018 | Vissamsetty | H04L 63/1491 |
| 10,169,586 | B2 * | 1/2019 | Maciejak | G06F 21/566 |

(Continued)

OTHER PUBLICATIONS

Routa Moussaileb, et al., Aug. 27-30, 2018, Ransomware's Early Mitigation Mechanisms, Proceeding ARES 2018 Proceedings of the 13th International Conference on Availability, Reliability and Security Article No. 2 , pp. 1-10.*

*Primary Examiner* — Lisa C Lewis
*Assistant Examiner* — Raied A Salman
(74) *Attorney, Agent, or Firm* — David R. Stevens; Stevens Law Group (57) ABSTRACT

Endpoints in a network environment include remote file systems mounted thereto that reference a file system generator that responds to file system commands with deception data. Requests to list the contents of a directory are intercepted, such as while a response is passed up through an IO stack. The response is modified to include references to deception files and directories that do not actually exist on the system hosting the file system generator. The number of the deception files and directories may be randomly selected. Requests to read deception files are answered by generating a file having a file type corresponding to the deception file. Deception files may be written back to the system by an attacker and then deleted.

18 Claims, 5 Drawing Sheets

(56) References Cited

U.S. PATENT DOCUMENTS

| | | | |
|---|---|---|---|
| 10,382,484 B2* | 8/2019 | Shayevitz | G06N 20/00 |
| 2014/0237562 A1* | 8/2014 | Nandakumar | G06F 21/36 |
| | | | 726/5 |
| 2016/0285914 A1* | 9/2016 | Singh | H04L 63/20 |
| 2016/0323316 A1* | 11/2016 | Kolton | H04L 63/145 |
| 2017/0180421 A1* | 6/2017 | Shieh | H04L 63/10 |
| 2017/0324774 A1* | 11/2017 | Ohayon | H04L 63/1408 |
| 2017/0324777 A1* | 11/2017 | Ohayon | H04L 63/1491 |
| 2018/0173876 A1* | 6/2018 | Vissamsetty | G06F 21/556 |
| 2018/0248896 A1* | 8/2018 | Challita | G06F 21/554 |

* cited by examiner

RANSOMWARE MITIGATION SYSTEM

BACKGROUND

Malware such as file infectors and ransomware attack network files residing on both local disks of endpoints and remote disks mounted on endpoints. This malware encrypts files and makes them unreadable. These types of attacks cause incredible damage and cost millions as companies choose to pay ransoms for their own data.

The systems and methods disclosed herein provide an improved approach for preventing ransomware attacks on endpoint systems.

BRIEF DESCRIPTION OF THE FIGURES

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the invention will be described and explained with additional specificity and detail through use of the accompanying drawings, in which.

DETAILED DESCRIPTION

It will be readily understood that the components of the invention, as generally described and illustrated in the Figures herein, could be arranged and designed in a wide variety of different configurations. Thus, the following more detailed description of the embodiments of the invention, as represented in the Figures, is not intended to limit the scope of the invention, as claimed, but is merely representative of certain examples of presently contemplated embodiments in accordance with the invention. The presently described embodiments will be best understood by reference to the drawings, wherein like parts are designated by like numerals throughout.

Embodiments in accordance with the invention may be embodied as an apparatus, method, or computer program product. Accordingly, the invention may take the form of an entirely hardware embodiment, an entirely software embodiment (including firmware, resident software, micro-code, etc.), or an embodiment combining software and hardware aspects that may all generally be referred to herein as a "module" or "system." Furthermore, the invention may take the form of a computer program product embodied in any tangible medium of expression having computer-usable program code embodied in the medium.

Any combination of one or more computer-usable or computer-readable media may be utilized. For example, a computer-readable medium may include one or more of a portable computer diskette, a hard disk, a random access memory (RAM) device, a read-only memory (ROM) device, an erasable programmable read-only memory (EPROM or Flash memory) device, a portable compact disc read-only memory (CDROM), an optical storage device, and a magnetic storage device. In selected embodiments, a computer-readable medium may comprise any non-transitory medium that can contain, store, communicate, propagate, or transport the program for use by or in connection with the instruction execution system, apparatus, or device.

Computer program code for carrying out operations of the invention may be written in any combination of one or more programming languages, including an object-oriented programming language such as Java, Smalltalk, C++, or the like and conventional procedural programming languages, such as the "C" programming language or similar programming languages, and may also use descriptive or markup languages such as HTML, XML, JSON, and the like. The program code may execute entirely on a computer system as a stand-alone software package, on a stand-alone hardware unit, partly on a remote computer spaced some distance from the computer, or entirely on a remote computer or server. In the latter scenario, the remote computer may be connected to the computer through any type of network, including a local area network (LAN) or a wide area network (WAN), or the connection may be made to an external computer (for example, through the Internet using an Internet Service Provider).

The invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions or code. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a non-transitory computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Figure 1:
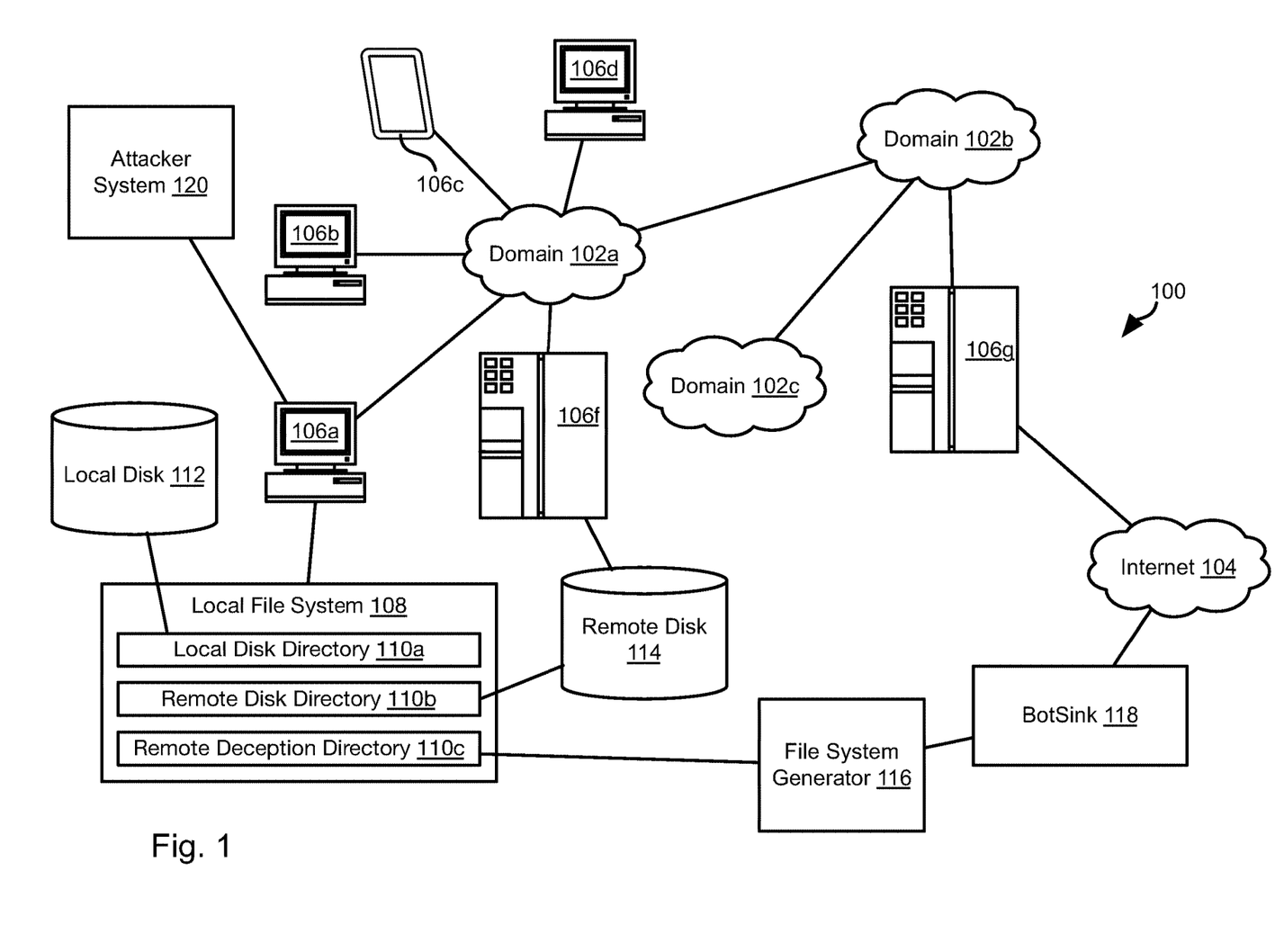
FIG. 1 is a schematic block diagram of a network environment for performing methods in accordance with an embodiment of the present invention.

Referring to FIG. 1, the methods disclosed herein may be practiced in a network environment 100 including a plurality of domains 102a-102c. The domains 102a-102c may be any network division, such as a subnet, local area network (LAN), virtual local area network (VLAN), or the like. The domains 102a-102c may be distributed within a same building or over a large geographic area with interconnecting links including the Internet 104. The illustrated domains 102a-102c may represent one or more network components, such as routers, switches, servers, and the like that implement routing of traffic within the domains 102a-102c and control traffic flowing into and out of the domains 102a-102c Each domain may include one or more endpoints 106a-106g. The endpoints 106a-106g are production computing devices that operate as personal computers for users or servers providing production services to other endpoints or to external computers accessing the network environment by way of the internet 104. The endpoints 106a-106g may be desktop or laptop computers, mobile phones, tablet computers, server computers, and any other type of computing device. Some endpoints 106a-106g may include internet-enabled devices, i.e. so-called internet of things (IoT) devices that are often a vulnerability.

The endpoints 106a-106g are not dedicated honeypots, but rather perform non-decoy functions and process legitimate production data and legitimate production tasks of an enterprise, such as functioning as user computers executing applications such as word processors, browsers, graphics programs etc. The endpoints 106a-106g may also function as web servers, database servers, remote login servers, application servers, and the like.

Some or all of the endpoints 106a-106g may host an operating system implementing a local file system 108. The file system 108 defines and provides an interface to a file system including local disk directory 110a stored on a local disk 112 hosted by the same endpoint 106a-106g. The file system 108 may also provide an interface to access remote volume directory 110b stored in a remote disk 114 hosted by a different endpoint 106a-106g. In the illustrated embodiment, endpoint 106f is a file server hosting remote disk 114 and the endpoint 106a mounts that remote disk 114 as part of its file system 108 such that some or all of the remote disk 114 may be accessed through the file system 108 of endpoint 106a.

The local file system 108 may also mount a remote deception directory 110c that refers to a file system generator 116 implemented by a BotSink 118. The file system generator 116 generates responses to file system commands and queries that simulate a directory populated with files and directories without actually storing the simulated directory. The operation of the file system generator 116 is described below with respect to FIGS. 2 through 5.

The remote deception directory 110c may include a plurality of directories mounted within the local file system 108 in various directories and sub-directories. The remote deception directories 110c may be mounted manually or the endpoints 106a-106g may execute a local application that coordinates with the file system generator 116 to mount the remote deception directors 110c throughout the local file system 108.

In some embodiments, the remote deception directories 110c are hidden such that they will not appear in a file system browser. For example, WINDOWS provides for the marking of files to be non-browsable using explorer. Accordingly, this function may be invoked for the deception directories 110c. The remote deception directories 110c may remain visible in response to queries received from a command line, as remote procedure calls (RPCs), or as file system commands from an application programming interface (API). Remote deception directories may be mounted at locations of a file system that are not accessed by users, such as temporary directories, system directories, or other obscure and non-user-oriented directories.

The BotSink 120 may further implement any of the method methods for detecting and engaging malicious code disclosed in the following applications (herein after "the incorporated applications"), which are hereby incorporated herein by reference in their entirety:

U.S. application Ser. No. 14/458,026, filed Aug. 12, 2014, and entitled DISTRIBUTED SYSTEM FOR BOT DETECTION;

U.S. application Ser. No. 14/466,646, filed Aug. 22, 2014, and entitled EVALUATING URLS FOR MALICIOUS CONTENT;

U.S. application Ser. No. 14/549,112, filed Nov. 20, 2014, and entitled METHOD FOR DIRECTING MALICIOUS ACTIVITY TO A MONITORING SYSTEM;

U.S. application Ser. No. 15/157,082, filed May 17, 2016, and entitled EMULATING SUCCESSFUL SHELLCODE ATTACKS;

U.S. application Ser. No. 14/805,202, filed Jul. 21, 2015, and entitled MONITORING ACCESS OF NETWORK DARKSPACE;

U.S. application Ser. No. 14/965,574, filed Dec. 10, 2015, and entitled DATABASE DECEPTION IN DIRECTORY SERVICES;

U.S. application Ser. No. 15/142,860, filed Apr. 29, 2016, and entitled AUTHENTICATION INCIDENT DETECTION AND MANAGEMENT;

U.S. application Ser. No. 15/153,471, filed May 12, 2016, and entitled LURING ATTACKERS TOWARDS DECEPTION SERVERS;

U.S. application Ser. No. 15/204,779, filed Jul. 7, 2016, and entitled DETECTING MAN-IN-THE-MIDDLE ATTACKS;

U.S. application Ser. No. 15/360,117, filed Nov. 23, 2016, and entitled IMPLEMENTING DECOYS IN NETWORK ENDPOINTS; and U.S. application Ser. No. 15/383,522 filed Dec. 19, 2016, and entitled DECEIVING ATTACKERS IN ENDPOINT SYSTEMS.

An attacker system 120 may infiltrate an endpoint 106a-106g and attempt to infect some or all of the directories 110a-110c. In a typical attack, files are encrypted and written back to the file system 108. The attacker than attempts to extort a ransom in order to decrypt them.

Figure 2:
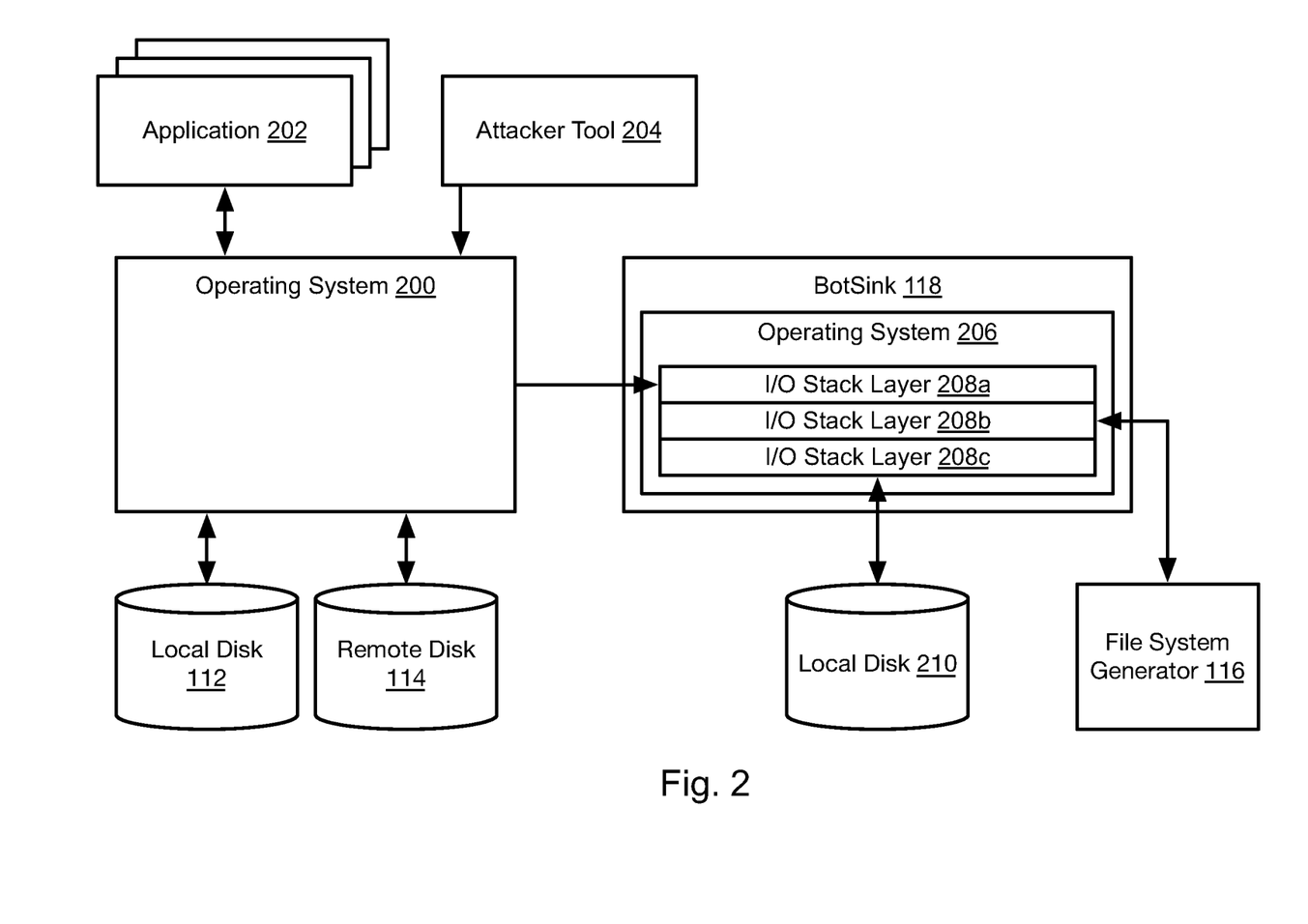
FIG. 2 is a diagram illustrating components for mitigating ransomware attacks in accordance with an embodiment of the present invention.

Referring to FIG. 2, an operating system 200 of an endpoint 106a-106g may receive file system commands from legitimate applications 202 executing on the endpoint 106a-106g as well as from an attacker tool 204 that has infiltrated the endpoint 106a-106g or is remotely accessing the endpoint 106a-106g.

File system commands may include commands to read a file, write to a file, delete a file, create a directory, delete a directory, move a file from one directory to a different directory, or list contents of a directory. The files and directories referenced by a file system command may be stored in the local disk 112, a remote disk 114, or a deception directory referencing the BotSink 118.

As discussed in greater detail below, upon receiving a file system command, the BotSink 118 may process the file system commands within an operating system 206 that may execute in the context of one of a plurality of virtual machines executed by the BotSink 118. File system commands may be received in an input/output (IO) stack of the operating system 206 including one or more layers 208a-208c. The file system stack may execute file system commands with respect to a local disk 210 hosted by the BotSink 118. The file system generator 116 may intercept commands and/or responses to commands at some point in the stack.

For example, in a WINDOWS operating system, commands from a user application are received by an IO manager, which passes the command to a mini filter driver, which then passes the command to a file system driver. In one embodiment, where the file system command is a request to view contents of a directory, a response from the file system driver may be intercepted by the file system generator 116 and then populated with references to deception directories and files that do not actually exist.

For example, where the operating system is LINUX-based, the I/O stack may include, starting immediately below an application, a system call interface, VFS (virtual file system) layer, extended file system layer (ext4), LVM (logical volume layer), block device interface, and device drivers. Accordingly, the file system generator 116 may intercept commands passing down through the stack and responses passing up through the stack at any of these layers and modify the command or response as outlined herein to reference deception files and/or directories. Other operating systems may include a similar stack and may similarly be integrated with the file system generator 116 to intercept and modify commands and responses passing through the stack.

Figure 3:
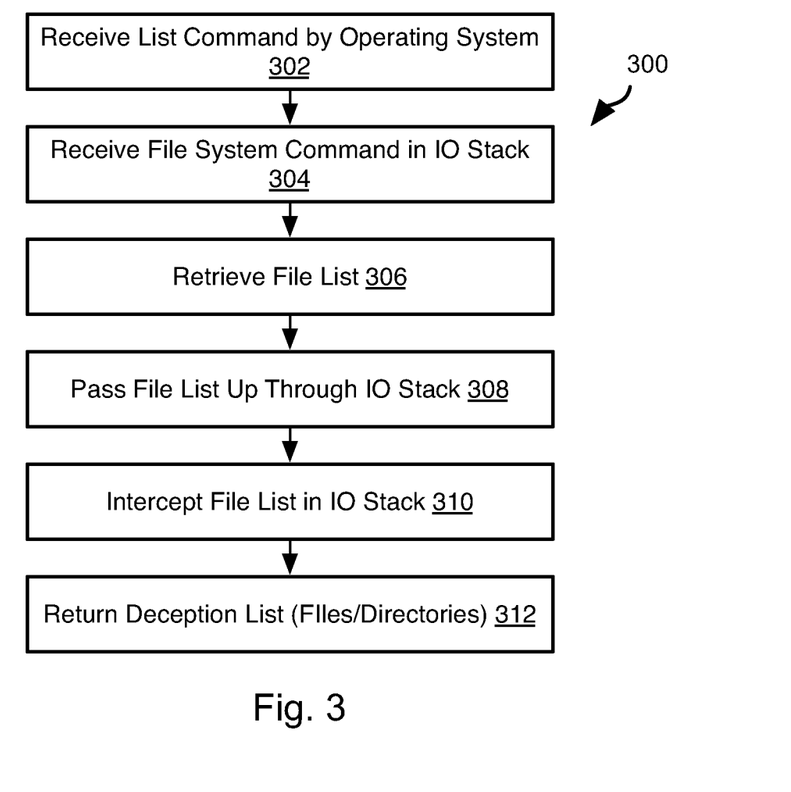
FIG. 3 is a process flow diagram of a method for engaging ransomware in accordance with an embodiment of the present invention.

Referring to FIG. 3, the illustrated method 300 may be executed by the BotSink 118, particularly the file system generator 116. The method 300 may include receiving 302 a list command by the operating system 206.

The list command may be received 302 from an endpoint 106a-106g operating system 200 receiving the FindFirstFile function, where the operating system 206 is a WINDOWS operating system. This results in a system call to the operating system 200. When this system call reaches the kernel mode of the operating system 206 of the BotSink 118, the IO manager may generate an IRP (IO request packet), specifically IRP_MJ_DIRECTORY_CONTROL, and provides the IRP to the file system to execute.

The IO stack then receives 304 and executed the IRP. In WINDOWS, the mini filter driver may fulfill the IRP, but in most cases it is transmitted to a lower layer in the IO stack for processing, e.g., the file system driver. The file system driver may retrieve 306 a list of files referenced by the directory referenced in the IRP and passes 308 the list back up through the IO stack, i.e. to the mini filter driver and IO manager.

The file system generator 116 intercepts 310 the list as it is passed up through the IO stack. For example, the file system generator 116 may intercept the list output by the file system driver before it is passed to the mini filter driver. In some embodiments, the BotSink may modify the mini filter driver such that it is operable to perform the interception of commands and responses to commands as well as perform conventional functions of a mini filter driver.

The file system generator 116 then replaces any files or directories in the list with references to deception files and directories that do not exist on the directory that was queried. The number of files and the number of directories may be selected according to one or more random numbers, such as output from a pseudo random number generator or some other means. Likewise, the names of the files and directories may be random strings or may be selected from a database of file names and a database of directory names. The selection from the databases may be random. The names of files added to the list may include file types (.doc, .pdf, .xls, .ppt, etc.), which may also be randomly selected for a given file name or may be part of the file name in the database.

In some instances, the list command may include a filter criteria such as *.docx, which requests only MICROSOFT WORD documents, or *.pdf, which requests only PDF (portable document format) files. Accordingly, in this case, the references to deception files may be selected or generated to all include the .pdf file extension.

The modified list is returned 312 to the operating system, such as to the mini filter driver or whichever layer of the IO stack above the layer from which the list was intercepted. This layer above then processes the modified list in the conventional manner. In the case of WINDOWS, the mini filter driver passes the modified list to the IO manager, which then returns the modified list to a source of the IRP. The modified list is then returned by the operating system 206 to the operating system 200 of the endpoint 106a-106g that invoked performance of the method 300 with the list command received at step 302.

Note that the method 300 described intercepting a response to a list command as it is being passed up through the IO stack. In other embodiments, a list command may be intercepted 310 as it is being passed down through the IO stack and a list including deception data may then be passed up through the IO stack, thereby bypassing any lower layers of the IO stack.

Figure 4:
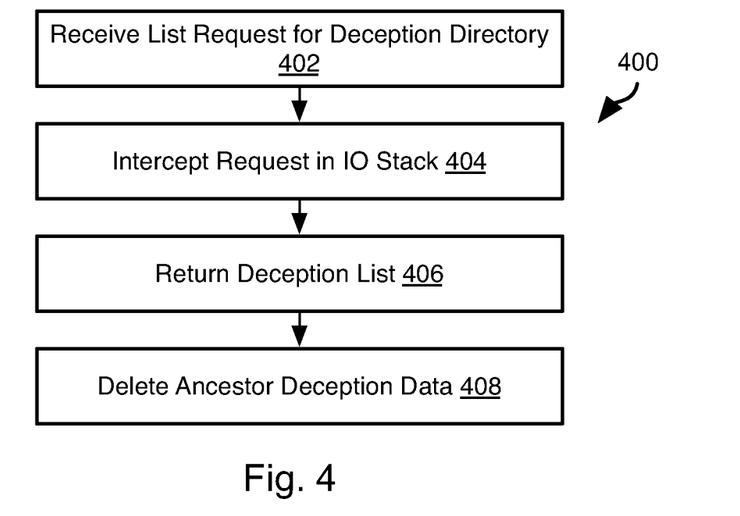
FIG. 4 is a process flow diagram of a method for processing file system queries to engage ransomware in accordance with an embodiment of the present invention.

Referring to FIG. 4, the illustrated method 400 may be executed by the BotSink 118, particularly the file system generator 116, in response to a file system command referencing a directory name that has previously been returned, such as according to the method 300. In some instances, lists of files and directories returned at step 312 of the method 300 may be temporarily stored by the file system generator 116. In this manner, file system commands referencing the names of directories that have been previously returned may be detected and processed according to the method 400. In other embodiments, any request to list the contents of directory will be processed according to the method 300 regardless of whether the directory has previously been returned in response to a list command.

The method 400 may include receiving 402 a list request for a deception directory, i.e. a directory referenced during a previous iteration of the method 400 or the method 300. The request may be intercepted 404 while passing through the IO stack, i.e. while the list request is being passed down through the IO stack or a response to the list request is being passed up through the IO stack. In some cases, since the directory included in the list request matches a previously-stored deception directory name, the list request may be intercepted 404 prior to passing to the IO stack and determined to be a request for a deception directory in response to detecting the match.

In either case, the response to the list command will be populated with references to a collection of deception directories and files and returned 406 to the endpoint that generated the list request. The deception directories and files may be generated in the same manner as for step 312 of the method 300. In some embodiments, the references to a collection of deception directories and files may be compared to previously returned references and only those references that they are not repetitive will be returned. Step 312 and step 406 preferably always include a reference to at least one deception directory. In this manner, the probing of a directory structure will never end and an attacker tool 204 will be distracted from infecting production files.

In some embodiments, the method 400 may further include deleting ancestor deception data. This data may include previously stored listings of deception files and directories, e.g. for an ancestor of the deception directory that is the subject of the method 400. In this manner, the BotSink 118 does not run out of storage despite providing an apparently infinite file system to the attacker tool 204.

As described below with respect to FIG. 5, deception files may also be returned to the attacker tool 204. These deception files may be written back to the BotSink 118 by the attacker tool 204 in encrypted form. These encrypted files may then be deleted at step 408, e.g. those encrypted files in ancestor directories of the directory that is the subject of the method 400. In this manner, the encrypted files do not accumulate and deplete available storage of the BotSink 118.

Figure 5:
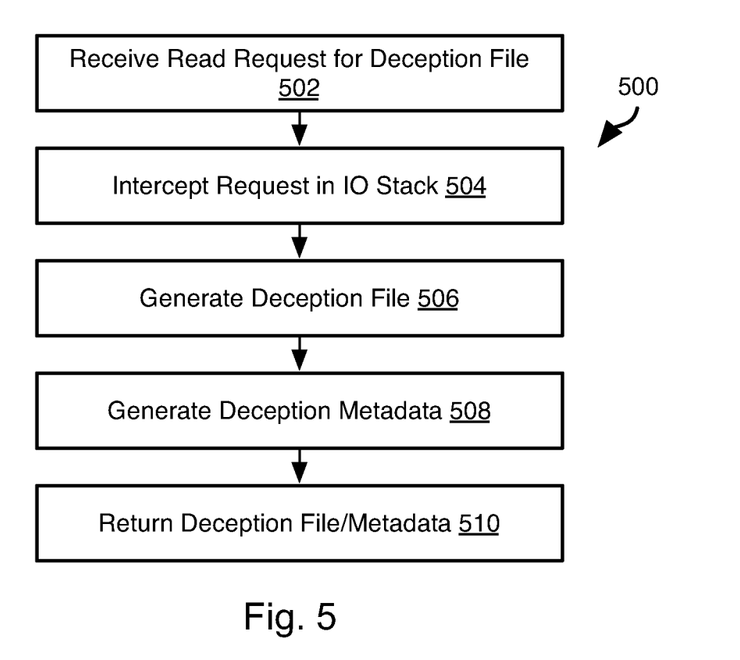
FIG. 5 is a process flow diagram of a method for processing requests for deception files in accordance with an embodiment of the present invention.

Referring to FIG. 5, the illustrated method 500 may be executed in response to a file system command. In particular, a command to read a deception file will be a commonly executed command by ransomware.

The method 500 may include receiving 502 a read request including a reference to a deception file returned in a previous iteration of the method 300 or method 400. As for the method 300, previously-returned listings may be stored in order to detect when a file command is received that includes a previously-returned reference to a deception file.

The method 500 may include intercepting 504 the read request either while being passed down through the IO stack, while a response to the read request is being passed up through the IO stack, or prior to passing the read request to the IO stack. For example, upon receiving a read request from an endpoint 106a-106g, the BotSink 118 may compare the file reference in the read request and compare it to previously-returned references to deception files. If there is a match, then the read request may be processed according to steps 506-510. If not, then the read request may be passed to the IO stack and processed in the conventional manner.

The method 500 may include processing the intercepted read request by generating 506 a deception file corresponding to the reference included in the read request. For example, if the file reference in the read request refers to a MICROSOFT WORD document (.doc), then the deception file may have a format corresponding to a MICROSOFT WORD document. Likewise, other file types may be simulated such as .pdf, .rtf, .xls, or the like. The simulated file may be generated from a template corresponding to the file type, which is then populated with random data (text, numbers, etc.) corresponding to the file type.

The file type corresponding to the file referenced in the read request may be included in the read request or may be determined by reviewing the list of previously-returned references to deception files, which may also store the file type corresponding to each reference.

The method 500 may further include generating 508 deception metadata to include with the deception file, this metadata may include a data created, date modified, date last opened, author, or any other metadata describing the creation and revision of the deception file. The deception metadata may be chosen according to randomly generated numbers such that the dates of creation modification, opening, and/or the dates of any revisions are different from a date of creation of the deception file. In this manner, files appear to be organically generated production files rather than deception files.

The deception file and metadata as generated at steps 506 and 508 may then be returned 510 to the endpoint 106a-106g from which the read request was received.

The typical operation of ransomware is to then encrypt the file and write it back to its original location. Accordingly, the method 500 may be followed by a write request including an encrypted version of the deception file returned during the method 500. This write request may be determined to include a reference to a deception file based on comparison to a list of previously-returned references. In response to this determination, the write request may be ignored and a simulated acknowledgment that the write request has completed may be returned to the endpoint 106a-106g that generated the write request.

In other embodiments, write requests may be executed in a conventional manner, which would include transmitting an acknowledgment. Inasmuch as the directory in which the deception file is made to appear to be in does not exist, if the write request is executed it may be performed in an actual directory stored in the local disk 210 of the BotSink 118. For example, deception directories may be created as, or processed as, aliases for an actual directory such that all write requests to a deception directory will be written to the actual directory. Data written to this actual directory may then be deleted periodically in order to avoid running out of storage space.

Figure 6:
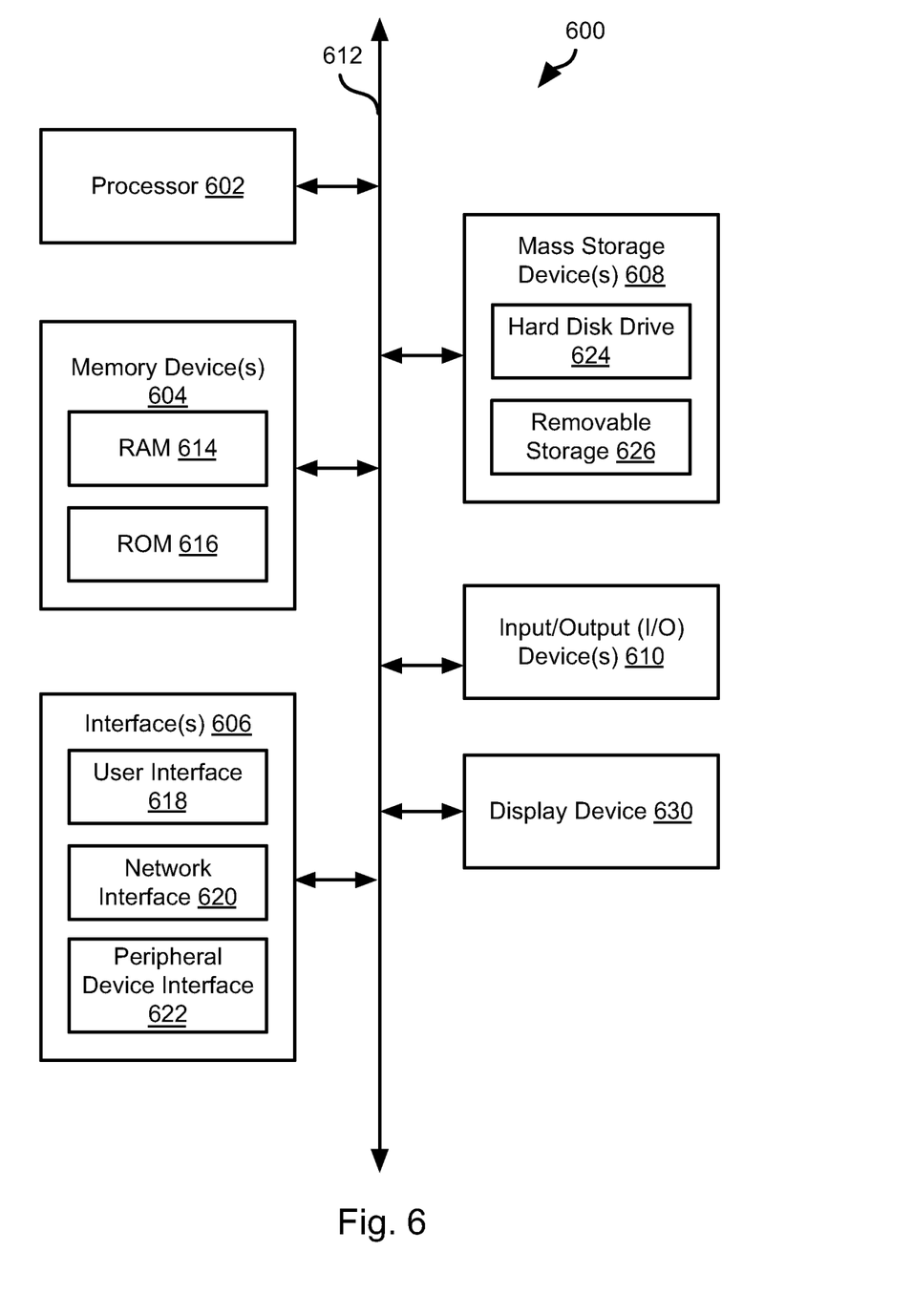
FIG. 6 is a schematic block diagram of a computer system suitable for implementing methods in accordance with embodiments of the present invention.

FIG. 6 is a block diagram illustrating an example computing device 600 which can be used to implement the system and methods disclosed herein. The endpoints 106a-106g, BotSink 118, and attacker system 120 may also have some or all of the attributes of the computing device 600. In some embodiments, a cluster of computing devices interconnected by a network may be used to implement any one or more components of the invention.

Computing device 600 may be used to perform various procedures, such as those discussed herein. Computing device 600 can function as a server, a client, or any other computing entity. Computing device can perform various monitoring functions as discussed herein, and can execute one or more application programs, such as the application programs described herein. Computing device 600 can be any of a wide variety of computing devices, such as a desktop computer, a notebook computer, a server computer, a handheld computer, tablet computer and the like.

Computing device 600 includes one or more processor(s) 602, one or more memory device(s) 604, one or more interface(s) 606, one or more mass storage device(s) 608, one or more Input/Output (110) device(s) 610, and a display device 630 all of which are coupled to a bus 612. Processor(s) 602 include one or more processors or controllers that execute instructions stored in memory device(s) 604 and/or mass storage device(s) 608. Processor(s) 602 may also include various types of computer-readable media, such as cache memory.

Memory device(s) 604 include various computer-readable media, such as volatile memory (e.g., random access memory (RAM) 614) and/or nonvolatile memory (e.g., read-only memory (ROM) 616). Memory device(s) 604 may also include rewritable ROM, such as Flash memory.

Mass storage device(s) 608 include various computer readable media, such as magnetic tapes, magnetic disks, optical disks, solid-state memory (e.g., Flash memory), and so forth. As shown in FIG. 6, a particular mass storage device is a hard disk drive 624. Various drives may also be included in mass storage device(s) 608 to enable reading from and/or writing to the various computer readable media. Mass storage device(s) 608 include removable media 626 and/or non-removable media.

I/O device(s) 610 include various devices that allow data and/or other information to be input to or retrieved from computing device 600. Example I/O device(s) 610 include cursor control devices, keyboards, keypads, microphones, monitors or other display devices, speakers, printers, network interface cards, modems, lenses, CCDs or other image capture devices, and the like.

Display device 630 includes any type of device capable of displaying information to one or more users of computing device 600. Examples of display device 630 include a monitor, display terminal, video projection device, and the like.

Interface(s) 606 include various interfaces that allow computing device 600 to interact with other systems, devices, or computing environments. Example interface(s) 606 include any number of different network interfaces 620, such as interfaces to local area networks (LANs), wide area networks (WANs), wireless networks, and the Internet. Other interface(s) include user interface 618 and peripheral device interface 622. The interface(s) 606 may also include one or more user interface elements 618. The interface(s) 606 may also include one or more peripheral interfaces such as interfaces for printers, pointing devices (mice, track pad, etc.), keyboards, and the like.

Bus 612 allows processor(s) 602, memory device(s) 604, interface(s) 606, mass storage device(s) 608, and I/O device(s) 610 to communicate with one another, as well as other devices or components coupled to bus 612. Bus 612 represents one or more of several types of bus structures, such as a system bus, PCI bus, IEEE 1394 bus, USB bus, and so forth.

For purposes of illustration, programs and other executable program components are shown herein as discrete blocks, although it is understood that such programs and components may reside at various times in different storage components of computing device 600, and are executed by processor(s) 602. Alternatively, the systems and procedures described herein can be implemented in hardware, or a combination of hardware, software, and/or firmware. For example, one or more application specific integrated circuits (ASICs) can be programmed to carry out one or more of the systems and procedures described herein.

The invention claimed is:

1. A method comprising:
   receiving, by a computer system, a file system query from a remote endpoint having the computer system mounted thereto as a remote file system;
   in response to the file system query, returning, by the computer system, to the remote endpoint, a deception directory listing including references to one or more deception files and one or more deception directories that do not correspond to any actual files and do not correspond to any actual directories;
   receiving, by the computer system, a request to list contents of one of the deception directories; and
   in response to the request to list contents of the one of the one or more deception directories:
      generating, by the computer system, references to at least one additional deception directory and additional deception files that do not correspond to any actual files and do not correspond to any actual directories; and
      returning, by the computer system, to the remote endpoint, a listing of the references to the at least one additional deception directory and additional deception files.

2. The method of claim 1, further comprising:
   intercepting, by the computer system, a response to the file system query from an operating system executing on the computer system;
   modifying, by the computer system, the response to obtain a modified response including the references to the one or more deception files and the one or more deception directories; and
   returning the response, by the operating system, the modified response to the endpoint.

3. The method of claim 2, wherein intercepting the response to the file system query from the operating system comprises intercepting a response from a file system driver; and
   wherein modifying the response to obtain the modified response comprises adding the references to the one or more deception files and the one or more deception directories to the response from the file system driver.

4. The method of claim 1, wherein the remote endpoint has one or more other actual remote storage devices mounted thereto and accessible as part of a file system of the remote endpoint.

5. The method of claim 1, further comprising:
   receiving, by the computer system, from the remote endpoint, a request for the one or more deception files;
   in response to the request for the one or more deception files, creating, by the computer system, one or more decoy files; and
   returning, by the computer system, to the remote endpoint, the one or more decoy files.

6. The method of claim 5, further comprising:
   receiving, by the computer system, from the remote endpoint, a request to overwrite the one or more decoy files with one or more encrypted files;
   in response to the request to overwrite the one or more decoy files, writing, by the computer system, the one or more encrypted files to a storage device; and
   deleting, by the computer system, the one or more encrypted files from the storage device.

7. The method of claim 5, wherein creating the decoy files comprises including metadata in the decoy files formatted according to file types of the one or more deception files.

8. The method of claim 7, wherein creating the decoy files comprises including a time of creation in the metadata of each file of the one or more decoy files that is different from a time of creating the each file.

9. The method of claim 1, further comprising:
   generating, by the computer system, one or more random numbers; and
   selecting, by the computer system, a first number of the deception files and a second number of the deception directories according to the one or more random numbers.

10. A system comprising:
    one or more processing devices;
    a storage device;
    one or more memory devices operably coupled to the one or more processing devices, the one or more memory devices storing executable code effective to cause the one or more processing devices to:
    receive a file system query from a remote endpoint having the system mounted thereto as a remote file system;
    in response to the file system query, generate, a first deception directory listing including references to one or more first deception files and one or more first deception directories that do not correspond to any actual files and do not correspond to any actual directories;

store the first deception directory listing on the storage device;

return the first deception directory listing to the remote endpoint receive, from the remote endpoint, a request to list contents of one of the one or more first deception directories in the first deception directory; and in response to the request to list contents of the one of the one or more first deception directories:

generate a second deception directory listing including references to at least one additional deception directory and additional deception files that do not correspond to any actual files and do not correspond to any actual directories;

return the second deception directory listing to the remote endpoint; and delete the first deception directory listing from the storage device.

11. The system of claim 10, wherein the executable code is further effective to cause the one or more processing devices to:

intercept a response to the file system query from an operating system executed by the one or more processing devices;

modify the response to obtain a modified response including the first deception directory listing; and return, by the operating system, the modified response to the endpoint.

12. The system of claim 11, wherein the executable code is further effective to cause the one or more processing devices to:

intercept the response to the file system query from the operating system by intercepting a response from a file system driver; and modify the response to obtain the modified response by adding the first deception directory listing to the response from the file system driver.

13. The system of claim 10, wherein the remote endpoint has one or more other actual remote storage devices mounted thereto and accessible as part of a file system of the remote endpoint.

14. The system of claim 10, wherein the executable code is further effective to cause the one or more processing devices to:

receive, from the remote endpoint, a request for the one or more first deception files;

in response to the request for the one or more first deception files, create one or more decoy files; and return, to the remote endpoint, the one or more decoy files.

15. The system of claim 14, wherein the executable code is further effective to cause the one or more processing devices to:

receive, from the remote endpoint, a request to overwrite the one or more decoy files with one or more encrypted files;

in response to the request to overwrite the one or more decoy files, write, the one or more encrypted files to the storage device; and delete, the one or more encrypted files from the storage device.

16. The system of claim 14, wherein the executable code is further effective to cause the one or more processing devices to create the decoy files by including metadata in the decoy files formatted according to file types of the one or more first deception files.

17. The system of claim 16, wherein the executable code is further effective to cause the one or more processing devices to create the decoy files by including a time of creation in the metadata of each file of the one or more decoy files that is different from a time of creating the each file.

18. The system of claim 10, wherein the executable code is further effective to cause the one or more processing devices to:

generate one or more random numbers; and select a first number of the first deception files and a second number of the first deception directories according to the one or more random numbers.

* * * * *